United States Patent
Suzuki et al.

(10) Patent No.: US 11,866,554 B2
(45) Date of Patent: Jan. 9, 2024

(54) POLYCARBOSILAZANE, AND COMPOSITION COMPRISING THE SAME, AND METHOD FOR PRODUCING SILICON-CONTAINING FILM USING THE SAME

(71) Applicant: Merck Patent GmbH, Darmstadt (DE)

(72) Inventors: Katsuchika Suzuki, Kakegawa (JP); Toshiya Okamura, Kakegawa (JP); Tetsuo Okayasu, Kakegawa (JP); Thorsten Vom Stein, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 18/032,192

(22) PCT Filed: Oct. 5, 2021

(86) PCT No.: PCT/EP2021/077379
§ 371 (c)(1),
(2) Date: Apr. 17, 2023

(87) PCT Pub. No.: WO2022/084022
PCT Pub. Date: Apr. 28, 2022

(65) Prior Publication Data
US 2023/0303775 A1    Sep. 28, 2023

(30) Foreign Application Priority Data
Oct. 20, 2020  (JP) ................. 2020-176008

(51) Int. Cl.
*C08G 77/60*  (2006.01)
*B05D 3/02*  (2006.01)
*C08G 77/62*  (2006.01)
*B05D 3/04*  (2006.01)

(52) U.S. Cl.
CPC ............... *C08G 77/60* (2013.01); *B05D 3/02* (2013.01); *B05D 3/046* (2013.01); *B05D 3/0466* (2013.01); *C08G 77/62* (2013.01); *C08J 2383/16* (2013.01)

(58) Field of Classification Search
CPC ....................................................... C08G 77/60
USPC ............................................... 528/35, 37, 38
See application file for complete search history.

(56) References Cited

U.S. PATENT DOCUMENTS

| | | | |
|---|---|---|---|
| 4,774,312 A | | 9/1988 | Burns |
| 4,847,345 A | * | 7/1989 | Takamizawa .......... C08G 77/62 501/96.2 |
| 2011/0077364 A1 | * | 3/2011 | Tazaki .................... C08L 83/14 525/477 |

FOREIGN PATENT DOCUMENTS

GB    1093898    * 12/1967

OTHER PUBLICATIONS

International Search Report and Written Opinion received for PCT Patent Application No. PCT/EP2021/077379, dated Jan. 4, 2022, 9 pages.

* cited by examiner

*Primary Examiner* — Marc S Zimmer
(74) *Attorney, Agent, or Firm* — Faegre Drinker Biddle & Reath LLP

(57) ABSTRACT

To provide a new silicon-containing polymer making it possible to form a cured film has features that its residual stress is small and crack resistance is high. A polycarbosilazane having particular cyclic structures.

15 Claims, 1 Drawing Sheet

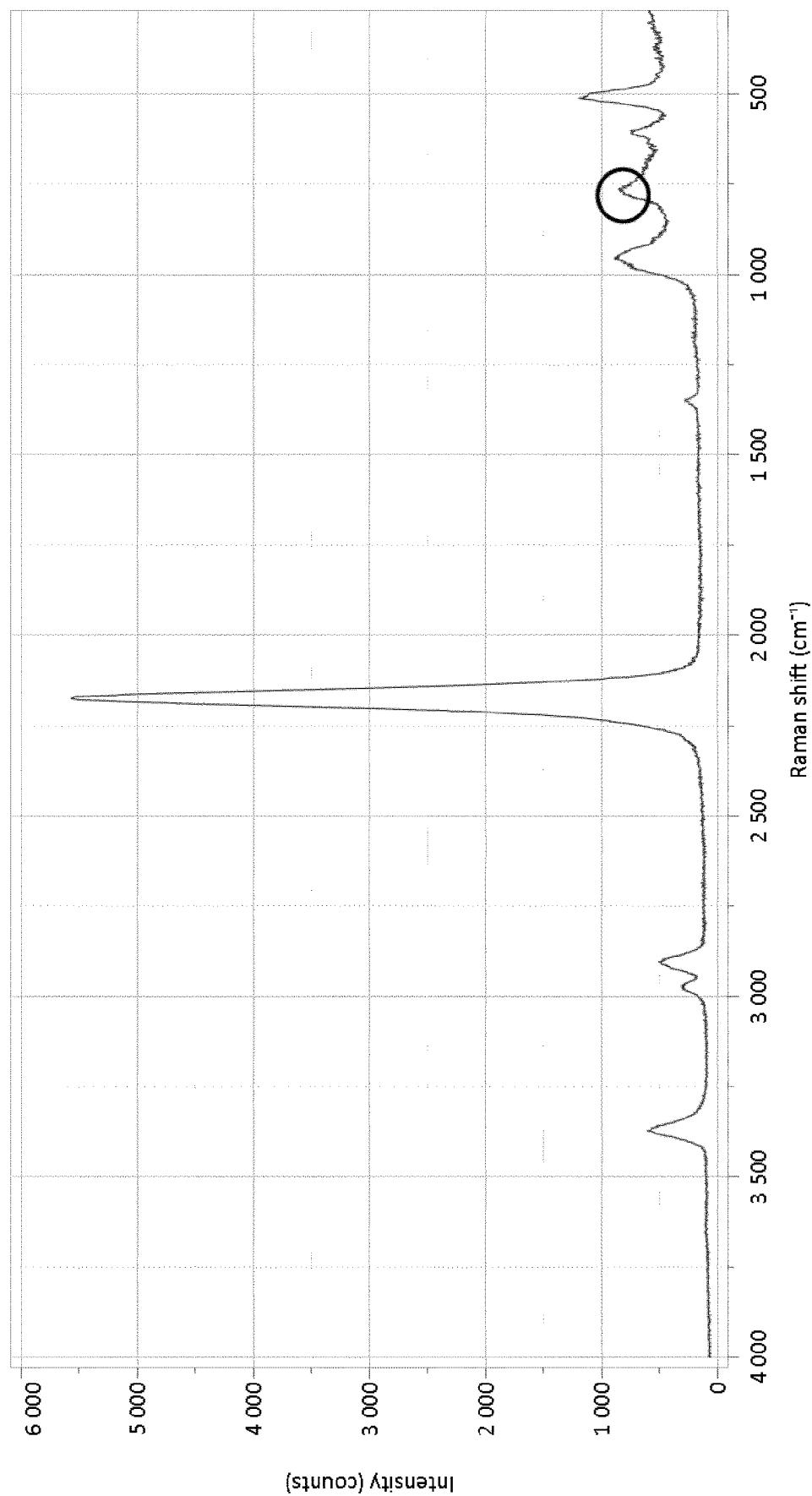

POLYCARBOSILAZANE, AND COMPOSITION COMPRISING THE SAME, AND METHOD FOR PRODUCING SILICON-CONTAINING FILM USING THE SAME

CROSS-REFERENCE TO RELATED APPLICATIONS

This application is a National stage application (under 35 U.S.C. § 371) of PCT/EP2021/077379, filed Oct. 5, 2021, which claims benefit of Japanese Application No. 2020-176008, filed Oct. 20, 2020, both of which are incorporated herein by reference in their entirety.

BACKGROUND OF THE INVENTION

Technical Field

The present invention relates to a polycarbosilazane. Further, the present invention also relates to a composition comprising a polycarbosilazane and a solvent, and a method for forming a silicon-containing film using the same.

Background Art

In manufacture of electronic devices, especially semiconductor devices, an interlayer insulating film may be formed between a transistor element and a bit line, between a bit line and a capacitor, between a capacitor and a metal wiring, between plural of metal wirings, and the like. Further, an insulating material may be filled in isolation trenches provided on a substrate surface or the like. Furthermore, after forming a semiconductor element on a substrate surface, a coating layer may be formed using a sealing material to provide a package. The interlayer insulating film and the coating layer are often formed from a silicon-containing material.

A chemical vapor deposition method (CVD method), a sol-gel method, a method for applying a composition comprising a silicon-containing polymer and baking, and the like are used for a method for forming a silicon-containing film such as a siliceous film, a silicon nitride film, a silicon carbide film or a silicon carbonitride film. Among these, the method for forming a silicon-containing film using a composition is often employed since it is relatively simple. Examples of the silicon-containing polymer include polysilazane, polysiloxane, polycarbosilane, polysilane, and the like.

A film obtained by coating a composition comprising a silicon-containing polymer and curing, is required to have resistance to chemicals used in subsequent steps, particularly acid resistance. Furthermore, small residual stress after a curing process is eagerly required.

Patent document 1 discloses a silicon-containing polymer obtained by reacting chlorodisilacyclobutanes with cyclic silazanes.

PRIOR ART DOCUMENTS

Patent Documents

[Patent document 1] U.S. Pat. No. 4,774,312 A

SUMMARY OF THE INVENTION

Problems to be Solved by the Invention

The present invention has been made in view of the above-described circumstances, and its object is to provide a new polycarbosilazane and a composition comprising it. A cured film formed with this polycarbosilazane has features that its residual stress is small and crack resistance is high. This cured film also has features that resistance to hydrofluoric acid is high.

Means for Solving the Problems

The polycarbosilazane according to the present invention comprises a repeating unit represented by the following formula (1) and a repeating unit represented by the following formula (2):

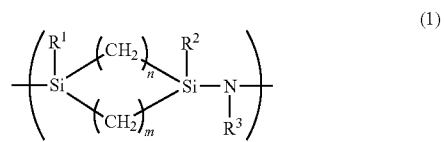
(1)

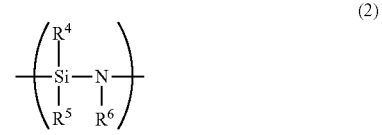
(2)

wherein,
$R^1$, $R^2$, and $R^3$ are each independently a single bond, hydrogen or $C_{1-4}$ alkyl;
$R^4$, $R^5$, and $R^6$ are each independently a single bond or hydrogen;
provided that when $R^1$, $R^2$, $R^4$, and $R^5$ are single bonds, $R^1$, $R^2$, $R^4$, and $R^5$ are bonded to N contained in other repeating units, and when $R^3$ and $R^6$ are single bonds, $R^3$ and $R^6$ are bonded to N contained in other repeating units; and n and m are each independently 1 to 3.

The composition according to the present invention comprises the above-described polycarbosilazane and a solvent.

The method for producing a silicon-containing film according to the present invention comprises: forming a coating film above a substrate with the above-described composition; and heating the coating film.

The silicon-containing film according to the present invention is obtainable by the above-described method.

The method for producing an electronic device according to the present invention comprises the above-described method.

Effects of the Invention

According to the present invention, a new polycarbosilazane and a composition comprising it are provided. A cured film formed with this polycarbosilazane has features that the residual stress is low and crack resistance is high. This cured film also has futures that its resistance to hydrofluoric acid is high.

BRIEF DESCRIPTION OF THE DRAWINGS

FIG. 1 is an example of a Raman spectrum of the polycarbosilazane according to the present invention.

DETAILED DESCRIPTION OF THE INVENTION

Mode for Carrying Out the Invention

Definition

Unless otherwise stated, terms used in the specification shall have the following meanings.

In the present specification, the use of the singular includes the plural, and the words "a", "an" and "the" mean "at least one", unless specifically stated otherwise. In the present specification, unless otherwise specifically mentioned, an element of a concept can be expressed by a plurality of species, and when the amount (for example, mass % or mol %) is described, it means sum of the plurality of species. The term "and/or" refers to any combination of the foregoing elements including using a single element.

In the case of numerical range is described with "to", "–" or "~", these include end points and units are common. For example, 5-25 mol % refers to that 5 mol % or more and 25 mol % or less.

In the present specification, alkyl means a group obtained by removing any one hydrogen from a linear or branched, saturated hydrocarbon and includes a linear alkyl and branched alkyl, and cycloalkyl means a group obtained by removing one hydrogen from a saturated hydrocarbon comprising a cyclic structure and optionally includes a linear or branched alkyl in the cyclic structure as a side chain.

In the present specification, alkenyl means a group obtained by removing any one hydrogen from a linear or branched hydrocarbon which has a carbon-carbon double bond.

In the present specification, the descriptions such as "Cx-y", "Cx-Cy" and "$C_x$" mean the number of carbon atoms in a molecule or substituent. For example, $C_{1-6}$ alkyl means alkyl having 1 or more and 6 or less carbons (methyl, ethyl, propyl, butyl, pentyl, hexyl etc.). Fluoroalkyl as used in the present specification means one in which one or more hydrogen in alkyl are replaced with fluorine, and fluoroaryl means one in which one or more hydrogen in aryl are replaced with fluorine.

In the present specification, in the case polymer comprises plural kinds of repeating units, these repeating units copolymerize. These copolymerizations can take alternating copolymerization, random copolymerization, block copolymerization, graft copolymerization, or any mixture of thereof.

<Polycarbosilazane>

The polycarbosilazane according to the present invention comprises a repeating unit represented by the following formula (1) and a repeating unit represented by the following formula (2):

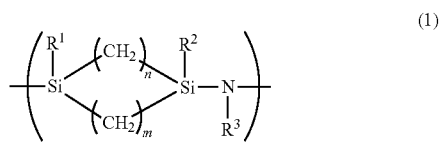

(1)

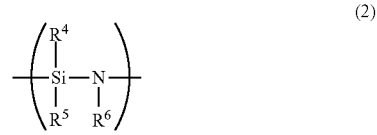

(2)

wherein,
$R^1$, $R^2$, and $R^3$ are each independently a single bond, hydrogen or $C_{1-4}$ alkyl, preferably a single bond or hydrogen.
$R^4$, $R^5$, and $R^6$ are each independently a single bond or hydrogen.
Provided that when $R^1$, $R^2$, $R^4$, and $R^5$ are single bonds, $R^1$, $R^2$, $R^4$, and $R^5$ are bonded to N contained in other repeating units, and when $R^3$ and $R^6$ are single bonds, $R^3$ and $R^6$ are bonded to N contained in other repeating units.
n and m are each independently 1 to 3, preferably 1 or 2, and more preferably 1.
Preferably, the polycarbosilazane according to the present invention is a polyperhydrocarbosilazane, in which $R^1$, $R^2$, and $R^3$ are a single bond or hydrogen and no hydrocarbon group other than $(CH_2)_n$ and $(CH_2)_m$ in formula (1) is included. Preferably, the polyperhydrocarbosilazane have a terminal group of —$SiH_3$.

An example of a polyperhydrocarbosilazane is as follows.

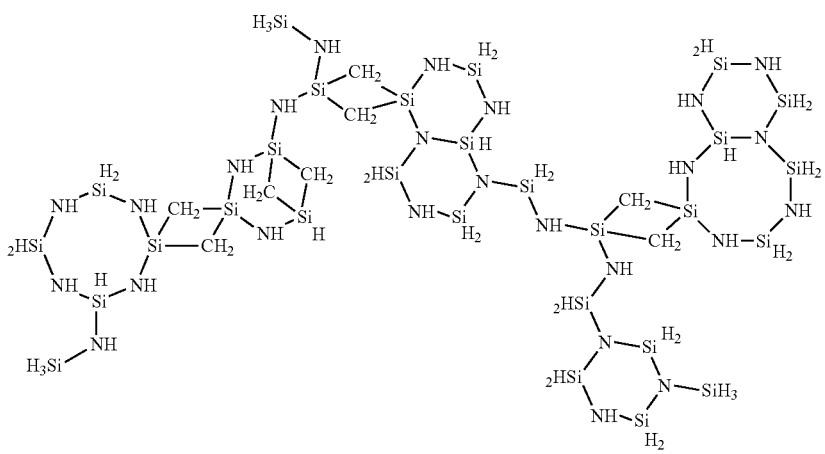

In the present specification, "%" means "% by mass" and "parts" means "parts by mass".

In the present specification, Celsius is used as the temperature unit. For example, 20 degrees means 20 degrees Celsius.

Embodiments of the present invention are described below in detail.

It is preferable that the polycarbosilazane according to the present invention has the ratio of N1/(N1+N2) of 0.02 to 0.33, more preferably 0.03 to 0.25, in which N1 is the number of repeating unit represented by the formula (1) and N2 is the number of repeating unit represented by the formula (2).

Preferably, the polycarbosilazane according to the present invention consists essentially of the repeating unit represented by the formula (1) and the repeating unit represented by formula (2). In the present invention, "essentially" means that 95 mass % or more of all constitutional units are the repeating unit represented by the formula (1) and the repeating unit represented by formula (2). More preferably, the polycarbosilazane comprise no repeating unit other than the repeating unit represented by the formula (1) and the repeating unit represented by formula (2).

One of the features of the polycarbosilazane according to the present invention is that its polymer backbone has a ring comprising 2 silicon atoms and 2 to 6, preferably 2, carbon atoms. This structure is considered to bring about the effects of low residual stress due to stress relaxation in the cured film manufacturing process.

The ratio of the number of C atoms to the number of Si atoms contained in the molecule of the polycarbosilazane (hereinafter referred to as "C/Si ratio") is preferably 5 to 250%, more preferably 5 to 120%, and more preferably 8 to 50%, since the effect of the ring structure is not observed when the number of C atoms is small, and the leakage current of the cured film becomes large.

C/Si ratio contained in the molecule can be obtained by, for example, performing elemental analysis on the film formed with polycarbosilazane by the Rutherford Backscattering Spectrometry, and calculating from the obtained elemental ratio. In particular, measurement can be performed in the following manner. Polycarbosilazane solution containing the polycarbosilazane according to the present invention and a solvent is spin-coated on a 4-inch wafer at 1,000 rpm under nitrogen atmosphere by using a spin coater (spin coater 1HDX2 (trade name) by Mikasa Co. Ltd.). The obtained coating film is baked at 240° C. for 10 minutes. The baked film is subjected to elemental analysis by Rutherford Backscattering Spectrometry using Pelletron 3SDH (trade name, manufactured by National Electrostatics Corporation) to measure the atomic ratio.

A ratio of an integrated intensity between 1.7 and 2.2 ppm with respect to sum of an integrated intensity between 1.7 and 2.2 ppm (hereinafter referred to as "Intensity $CH_2$") and an integrated intensity between 1.0 and 1.6 ppm (hereinafter referred to as "Intensity NH") ([Intensity $CH_2$/(Intensity $CH_2$+Intensity NH)]) of the polycarbosilazane according to the present invention in a proton nuclear magnetic resonance (1H-NMR) spectrum is preferably 0.050 to 0.50, and more preferably 0.080 to 0.40. In the present specification, "integrated intensity" for example between 1.7 and 2.2 ppm means the integrated value of the spectrum of 1H-NMR in the range of between 1.7 ppm and 2.2 ppm, that is, the area of the region surrounded by the curve and the baseline where the intensity becomes 0.

An example of the measurement method of 1H-NMR spectrum will be explained. A sample solution is prepared by dissolving 0.4 g of the polycarbosilazane in 1.6 g of a deuterochloroform. Tetramethylsilane is added to the solution as internal standard for calibrating chemical shift. The sample solution is measured using a nuclear magnetic resonance apparatus to obtain a 1H-NMR spectrum.

The mass average molecular weight of polycarbosilazane according to the present invention is preferably large, in order to reduce evaporation of low-molecular components, and to prevent a volume shrinkage in fine trenches. On the other hand, the polycarbosilazane preferably has low viscosity, in order to have a fine coatability and fill a narrow and a high aspect ratio trench. Thus, the mass average molecular weight of the polycarbosilazane is preferably 1,500 to 25,000, and more preferably 2,000 to 20,000. A mass average molecular weight means one in terms of polystyrene, and can be measured by a gel permeation chromatography based on polystyrene standard.

The synthesis method for the polycarbosilazane according to the present invention is not particularly limited. The polycarbosilazane according to the present invention is obtainable by co-ammonolysis of at least one compound represented by the following formula (3), and at least one compound represented by the following formula (4).

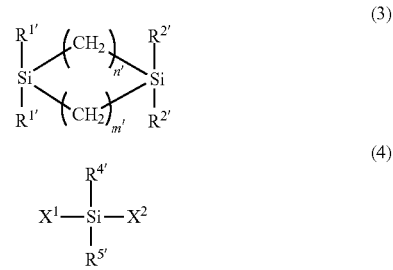

Wherein,
$R^{1\prime}$ and $R^{2\prime}$ are each independently hydrogen, chlorine, bromine or $C_{1-4}$ alkyl, preferably hydrogen, chlorine, or bromine;
$R^{4\prime}$ and $R^{5\prime}$ are each independently hydrogen, chlorine, or bromine;
$X^1$ and $X^2$ are each independently chlorine or bromine; and
$m^1$ and $n^1$ are each independently 1 to 3, preferably 1 or 2, and more preferably 1.

The molar ratio of the compound represented by the formula (3) to the compound represented by the formula (4) is preferably 0.02 to 0.5, and more preferably 0.03 to 0.33. When the molar ratio is less than 0.02, the resultant silicon-containing film is not bearable to acid. On the other hand, when the molar ratio is more than 0.5, the leak current of the resultant silicon-containing film becomes larger.

Examples of the silicon compound represented by the formula (3) include: 1,1,3,3-tetramethyl-1,3-disilacyclobutane, 1,1-dichloro-1,3-disilacyclobutane, 1,3-dichloro-1,3-disilacyclobutane, 1,1-dibromo-1,3-disilacyclobutane, 1,3-dibromo-1,3-disilacyclobutane, 1-bromo-1-chloro-1,3-disilacyclobutane, 1-bromo-3-chloro-1,3-disilacyclobutane, 1,1,3-trichloro-1,3-disilacyclobutane, 1,1,3-tribromo-1,3-disilacyclobutane, 1,1-dichloro-3-bromo-1,3-disilacyclobutane, 1,3-dichloro-1-bromo-1,3-disilacyclobutane, 1,1,3,3-tetrachloro-1,3-disilacyclobutane, 1,1,3,3-tetrabromo-1,3-disilacyclobutane, 1,1,3-tribromo-3-chloro-1,3-disilacyclobutane, 1,1-dibromo-3,3-dichloro-1,3-disilacyclobutane, 1,3-dibromo-1,3-dichloro-1,3-disilacyclobutane, 1-bromo-1,1,3-trichloro-1,3-disilacyclobutane, 1,3-dichloro-1,3-dimethyl-1,3-disilacyclobutane, 1,3-dibromo-1,3-dimethyl-1,3-disilacyclobutane, 1-bromo-3-chloro-1,3-dimethyl-1,3-disilacyclobutane, 1,1-dibromo-3,3-dimethyl-1,3-disilacyclobutane, 1,1-dichloro-3,3-dimethyl-1,3-disilacyclobutane, 1,3-dichloro-1,3-diethyl-1,3-disilacyclobutane, 1,3-dibromo-1,3-diethyl-1,3-disilacyclobutane, 1-bromo-3-chloro-1,3-diethyl-1,3-disilacyclobutane, 1,1-dibromo-3,3-diethyl-1,3-disilacyclobutane, 1,1-dichloro-3,3-diethyl-1,3-disilacyclobutane, 1,3-dichloro-1,3-dipropyl-1,3-disilacyclobutane, 1,3-dibromo-1,3-dipropyl-1,3-disilacyclobutane, 1-bromo-3-chloro-1,3-dipropyl-1,3- disilacyclobutane, 1,1-dibromo-3,3-dipropyl-1,3-disilacyclobutane, 1,1-dichloro-3,3-dipropyl-1,3-disilacyclobutane, 1,3-dichloro-1,3-dibutyl-1,3-disilacyclobutane, 1,3-dibromo-1,3-dibutyl-1,3-disilacyclobutane, 1-bromo-3-chloro-1,3-dibutyl-1,3-disilacyclobutane, 1,1-dibromo-3,3-dibutyl-1,3-disilacyclobutane, 1,1-dichloro-3,3-dibutyl-1,3-disilacyclobutane, 1,3-dichloro-1-methyl-1,3-disilacyclobutane, 1,3-dibromo-1-methyl-1,3-disilacyclobutane, 1-bromo-3-chloro-1-methyl-1,3-disilacyclobutane, 1-bromo-3-chloro-3-methyl-1,3-disilacyclobutane, 1,1-dibromo-3-methyl-1,3-disilacyclobutane, 1,1-dichloro-3-methyl-1,3-disilacyclobutane, 1,3-dichloro-1-ethyl-1,3-disilacyclobutane, 1,3-dibromo-1-ethyl-1,3-disilacyclobutane, 1-bromo-3-chloro-1-ethyl-1,3-disilacyclobutane, 1-bromo-3-chloro-3-ethyl-1,3-disilacyclobutane, 1,1-dibromo-3-ethyl-1,3-disilacyclobutane, 1,1-dichloro-3-ethyl-1,3-disilacyclobutane, 1,3-dichloro-1-propyl-1,3-disilacyclobutane, 1,3-dibromo-1-propyl-1,3-disilacyclobutane, 1-bromo-3-chloro-1-propyl-1,3-disilacyclobutane, 1-bromo-3-chloro-3-propyl-1,3-disilacyclobutane, 1,1-dibromo-3-propyl-1,3-disilacyclobutane, 1,1-dichloro-3-propyl-1,3-disilacyclobutane, 1,3-dichloro-1-butyl-1,3-disilacyclobutane, 1,3-dibromo-1-butyl-1,3-disilacyclobutane, 1-bromo-3-chloro-1-butyl-1,3-disilacyclobutane, 1-bromo-3-chloro-3-butyl-1,3-disilacyclobutane, 1,1-dibromo-3-butyl-1,3-disilacyclobutane, 1,1-dichloro-3-butyl-1,3-disilacyclobutane, 1-bromo-1,3-disilacyclobutane, 1-bromo-1,3,3-trimethyl-1,3-disilacyclobutane, 1-bromo-3,3-dimethyl-1,3-disilacyclobutane, 1-bromo-1,3-dimethyl-1,3-disilacyclobutane, 1-bromo-3-methyl-1,3-disilacyclobutane, 1-bromo-1,3,3-triethyl-1,3-disilacyclobutane, 1-bromo-3,3-diethyl-1,3-disilacyclobutane, 1-bromo-1,3-diethyl-1,3-disilacyclobutane, 1-bromo-3-ethyl-1,3-disilacyclobutane, 1-bromo-1,3,3-tripropyl-1,3-disilacyclobutane, 1-bromo-3,3-dipropyl-1,3-disilacyclobutane, 1-bromo-1,3-dipropyl-1,3-disilacyclobutane, 1-bromo-3-propyl-1,3-disilacyclobutane, 1-bromo-1,3,3-tributyl-1,3-disilacyclobutane, 1-bromo-3,3-dibutyl-1,3-disilacyclobutane, 1-bromo-1,3-dibutyl-1,3-disilacyclobutane, 1-bromo-3-butyl-1,3-disilacyclobutane, 1-chloro-1,3-disilacyclobutane, 1-chloro-1,3,3-trimethyl-1,3-disilacyclobutane, 1-chloro-3,3-dimethyl-1,3-disilacyclobutane, 1-chloro-1,3-dimethyl-1,3-disilacyclobutane, 1-chloro-3-methyl-1,3-disilacyclobutane, 1-chloro-1,3,3-triethyl-1,3-disilacyclobutane, 1-chloro-3,3-diethyl-1,3-disilacyclobutane, 1-chloro-1,3-diethyl-1,3-disilacyclobutane, 1-chloro-3-ethyl-1,3-disilacyclobutane, 1-chloro-1,3,3-tripropyl-1,3-disilacyclobutane, 1-chloro-3,3-dipropyl-1,3-disilacyclobutane, 1-chloro-1,3-dipropyl-1,3-disilacyclobutane, 1-chloro-3-propyl-1,3-disilacyclobutane, 1-chloro-1,3,3-tributyl-1,3-disilacyclobutane, 1-chloro-3,3-dibutyl-1,3-disilacyclobutane, 1-chloro-1,3-dibutyl-1,3-disilacyclobutane, 1-chloro-3-butyl-1,3-disilacyclobutane, 1,1,4,4-tetrachloro-1,4-disilacyclohexane, 1,1,4,4-tetrachlorobromo-1,4-disilacyclohexane, 1,1,4-trichloro-1,4-disilacyclohexane, 1,1,4-tribromo-1,4-disilacyclohexane, 1,1,4-trichloro-4-methyl-1,4-disilacyclohexane, 1,1,4-tribromo-4-methyl-1,4-disilacyclohexane, 1,1,4-trichloro-4-ethyl-1,4-disilacyclohexane, 1,1,4-tribromo-4-ethyl-1,4-disilacyclohexane, 1,1,4-trichloro-4-propyl-1,4-disilacyclohexane, 1,1,4-tribromo-4-propyl-1,4-disilacyclohexane, 1,1,4-trichloro-4-butyl-1,4-disilacyclohexane, 1,1,4-tribromo-4-butyl-1,4-disilacyclohexane, 1,4-dichloro-1,4-disilacyclohexane, 1,4-dibromo-1,4-disilacyclohexane, 1,4-dichloro-4-methyl-1,4-disilacyclohexane, 1,4-dichloro-1,4-dimethyl-1,4-disilacyclohexane, 1,4-dibromo-4-methyl-1,4-disilacyclohexane, 1,4-dibromo-1,4-dimethyl-1,4-disilacyclohexane, 1,4-dichloro-4-ethyl-1,4-disilacyclohexane, 1,4-dichloro-1,4-diethyl-1,4-disilacyclohexane, 1,4-dibromo-4-ethyl-1,4-disilacyclohexane, 1,4-dibromo-1,4-diethyl-1,4-disilacyclohexane, 1,4-dichloro-4-propyl-1,4-disilacyclohexane, 1,4-dichloro-1,4-dipropyl-1,4-disilacyclohexane, 1,4-dibromo-4-propyl-1,4-disilacyclohexane, 1,4-dibromo-1,4-dipropyl-1,4-disilacyclohexane, 1,4-dichloro-4-butyl-1,4-disilacyclohexane, 1,4-dichloro-1,4-dibutyl-1,4-disilacyclohexane, 1,4-dibromo-4-butyl-1,4-disilacyclohexane, 1,4-dibromo-1,4-dibutyl-1,4-disilacyclohexane, 1,1-dichloro-1,4-disilacyclohexane, 1,1-dibromo-1,4-disilacyclohexane, 1,1-dichloro-4-methyl-1,4-disilacyclohexane, 1,1-dichloro-4,4-dimethyl-1,4-disilacyclohexane, 1,1-dibromo-4-methyl-1,4-disilacyclohexane, 1,1-dibromo-4,4-dimethyl-1,4-disilacyclohexane, 1,1-dichloro-4-ethyl-1,4-disilacyclohexane, 1,1-dichloro-4,4-diethyl-1,4-disilacyclohexane, 1,1-dibromo-4-ethyl-1,4-disilacyclohexane, 1,1-dibromo-4,4-diethyl-1,4-disilacyclohexane, 1,1-dichloro-4-propyl-1,4-disilacyclohexane, 1,1-dichloro-4,4-dipropyl-1,4-disilacyclohexane, 1,1-dibromo-4-propyl-1,4-disilacyclohexane, 1,1-dibromo-4,4-dipropyl-1,4-disilacyclohexane, 1,1-dichloro-4-butyl-1,4-disilacyclohexane, 1,1-dichloro-4,4-dibutyl-1,4-disilacyclohexane, 1,1-dibromo-4-butyl-1,4-disilacyclohexane, 1,1-dibromo-4,4-dibutyl-1,4-disilacyclohexane, 1-bromo-1,4-disilacyclohexane, 1-bromo-1,4,4-trimethyl-1,4-disilacyclohexane, 1-bromo-4,4-dimethyl-1,4-disilacyclohexane, 1-bromo-1,4-dimethyl-1,4-disilacyclohexane, 1-bromo-4-methyl-1,4-disilacyclohexane, 1-bromo-1,4,4-triethyl-1,4-disilacyclohexane, 1-bromo-4,4-diethyl-1,4-disilacyclohexane, 1-bromo-1,4-diethyl-1,4-disilacyclohexane, 1-bromo-4-ethyl-1,4-disilacyclohexane, 1-bromo-1,4,4-tripropyl-1,4-disilacyclohexane, 1-bromo-4,4-dipropyl-1,4-disilacyclohexane, 1-bromo-1,4-dipropyl-1,4-disilacyclohexane, 1-bromo-4-propyl-1,4-disilacyclohexane, 1-bromo-1,4,4-tributyl-1,4-disilacyclohexane, 1-bromo-4,4-dibutyl-1,4-disilacyclohexane, 1-bromo-1,4-dibutyl-1,4-disilacyclohexane, 1-bromo-4-butyl-1,4-disilacyclohexane, 1-chloro-1,4-disilacyclohexane, 1-chloro-1,4,4-trimethyl-1,4-disilacyclohexane, 1-chloro-4,4-dimethyl-1,4-disilacyclohexane, 1-chloro-1,4-dimethyl-1,4-disilacyclohexane, 1-chloro-4-methyl-1,4-disilacyclohexane, 1-chloro-1,4,4-triethyl-1,4-disilacyclohexane, 1-chloro-4,4-diethyl-1,4-disilacyclohexane, 1-chloro-1,4-diethyl-1,4-disilacyclohexane, 1-chloro-4-ethyl-1,4-disilacyclohexane, 1-chloro-1,4,4-tripropyl-1,4-disilacyclohexane, 1-chloro-4,4-dipropyl-1,4-disilacyclohexane, 1-chloro-1,4-dipropyl-1,4-disilacyclohexane, 1-chloro-4-propyl-1,4-disilacyclohexane, 1-chloro-1,4,4-tributyl-1,4-disilacyclohexane, 1-chloro-4,4-dibutyl-1,4-disilacyclohexane, 1-chloro-1,4-dibutyl-1,4-disilacyclohexane, 1-chloro-4-butyl-1,4-disilacyclohexane, 1,1,3,3-tetrachloro-1,3-disilacyclohexane, 1,1,3,3-tetrachlorobromo-1,3-disilacyclohexane, 1,1,3-trichloro-1,3-disilacyclohexane, 1,1,3-tribromo-1,3-disilacyclohexane, 1,1,3-trichloro-3-methyl-1,3-disilacyclohexane, 1,1,3-tribromo-3-methyl-1,3-disilacyclohexane, 1,1,3-trichloro-3-ethyl-1,3- disilacyclohexane, 1,1,3-tribromo-3-ethyl-1,3-disilacyclohexane, 1,1,3-trichloro-3-propyl-1,3-disilacyclohexane, 1,1,3-tribromo-3-propyl-1,3-disilacyclohexane, 1,1,3-trichloro-3-butyl-1,3-disilacyclohexane, 1,1,3-tribromo-3-butyl-1,3-disilacyclohexane, 1,3-dichloro-1,3-disilacyclohexane, 1,3-dibromo-1,3-disilacyclohexane, 1,3-dichloro-3-methyl-1,3-disilacyclohexane, 1,3-dichloro-1,3-dimethyl-1,3-disilacyclohexane, 1,3-dibromo-3-methyl-1,3-disilacyclohexane, 1,3-dibromo-1,3-dimethyl-1,3-disilacyclohexane, 1,3-dichloro-3-ethyl-1,3-disilacyclohexane, 1,3-dichloro-1,3-diethyl-1,3-disilacyclohexane, 1,3-dibromo-3-ethyl-1,3-disilacyclohexane, 1,3-dibromo-1,3-diethyl-1,3-disilacyclohexane, 1,3-dichloro-3-propyl-1,3-disilacyclohexane, 1,3-dichloro-1,3-dipropyl-1,3-disilacyclohexane, 1,3-dibromo-3-propyl-1,3-disilacyclohexane, 1,3-dibromo-1,3-dipropyl-1,3-disilacyclohexane, 1,3-dichloro-3-butyl-1,3-disilacyclohexane, 1,3-dichloro-1,3-dibutyl-1,3-disilacyclohexane, 1,3-dibromo-3-butyl-1,3-disilacyclohexane, 1,3-dibromo-1,3-dibutyl-1,3-disilacyclohexane, 1,1-dichloro-1,3-disilacyclohexane, 1,1-dibromo-1,3-disilacyclohexane, 1,1-dichloro-3-methyl-1,3-disilacyclohexane, 1,1-dichloro-3,3-dimethyl-1,3-disilacyclohexane, 1,1-dibromo-3-methyl-1,3-disilacyclohexane, 1,1-dibromo-3,3-dimethyl-1,3-disilacyclohexane, 1,1-dichloro-3-ethyl-1,3-disilacyclohexane, 1,1-dichloro-3,3-diethyl-1,3-disilacyclohexane, 1,1-dibromo-3-ethyl-1,3-disilacyclohexane, 1,1-dibromo-3,3-diethyl-1,3-disilacyclohexane, 1,1-dichloro-3-propyl-1,3-disilacyclohexane, 1,1-dichloro-3,3-dipropyl-1,3-disilacyclohexane, 1,1-dibromo-3-propyl-1,3-disilacyclohexane, 1,1-dibromo-3,3-dipropyl-1,3-disilacyclohexane, 1,1-dichloro-3-butyl-1,3-disilacyclohexane, 1,1-dichloro-3,3-dibutyl-1,3-disilacyclohexane, 1,1-dibromo-3-butyl-1,3-disilacyclohexane, 1,1-dibromo-3,3-dibutyl-1,3-disilacyclohexane, 1-bromo-1,3-disilacyclohexane, 1-bromo-1,3,3-trimethyl-1,3-disilacyclohexane, 1-bromo-3,3-dimethyl-1,3-disilacyclohexane, 1-bromo-1,3-dimethyl-1,3-disilacyclohexane, 1-bromo-3-methyl-1,3-disilacyclohexane, 1-bromo-1,3,3-triethyl-1,3-disilacyclohexane, 1-bromo-3,3-diethyl-1,3-disilacyclohexane, 1-bromo-1,3-diethyl-1,3-disilacyclohexane, 1-bromo-3-ethyl-1,3-disilacyclohexane, 1-bromo-1,3,3-tripropyl-1,3-disilacyclohexane, 1-bromo-3,3-dipropyl-1,3-disilacyclohexane, 1-bromo-1,3-dipropyl-1,3-disilacyclohexane, 1-bromo-3-propyl-1,3-disilacyclohexane, 1-bromo-1,3,3-tributyl-1,3-disilacyclohexane, 1-bromo-3,3-dibutyl-1,3-disilacyclohexane, 1-bromo-1,3-dibutyl-1,3-disilacyclohexane, 1-bromo-3-butyl-1,3-disilacyclohexane, 1-chloro-1,3-disilacyclohexane, 1-chloro-1,3,3-trimethyl-1,3-disilacyclohexane, 1-chloro-3,3-dimethyl-1,3-disilacyclohexane, 1-chloro-1,3-dimethyl-1,3-disilacyclohexane, 1-chloro-3-methyl-1,3-disilacyclohexane, 1-chloro-1,3,3-triethyl-1,3-disilacyclohexane, 1-chloro-3,3-diethyl-1,3-disilacyclohexane, 1-chloro-1,3-diethyl-1,3-disilacyclohexane, 1-chloro-3-ethyl-1,3-disilacyclohexane, 1-chloro-1,3,3-tripropyl-1,3-disilacyclohexane, 1-chloro-3,3-dipropyl-1,3-disilacyclohexane, 1-chloro-1,3-dipropyl-1,3-disilacyclohexane, 1-chloro-3-propyl-1,3-disilacyclohexane, 1-chloro-1,3,3-tributyl-1,3-disilacyclohexane, 1-chloro-3,3-dibutyl-1,3-disilacyclohexane, 1-chloro-1,3-dibutyl-1,3-disilacyclohexane, 1-chloro-3-butyl-1,3-disilacyclohexane, preferably, 1,1-dichloro-1,3-disilacyclobutane, 1,3-dichloro-1,3-disilacyclobutane, 1,1-dibromo-1,3-disilacyclobutane, 1,3-dibromo-1,3-disilacyclobutane, 1-bromo-1-chloro-1,3-disilacyclobutane, 1-bromo-3-chloro-1,3-disilacyclobutane, 1,1,3-trichloro-1,3-disilacyclobutane, 1,1,3-tribromo-1,3-disilacyclobutane, 1,1-dichloro-3-bromo-1,3-disilacyclobutane, 1,3-dichloro-1-bromo-1,3-disilacyclobutane, 1,1,3,3-tetrachloro-1,3-disilacyclobutane, 1,1,3,3-tetrabromo-1,3-disilacyclobutane, 1,1,3-tribromo-3-chloro-1,3-disilacyclobutane, 1,1-dibromo-3,3-dichloro-1,3-disilacyclobutane, 1,3-dibromo-1,3-dichloro-1,3-disilacyclobutane, 1-bromo-1,1,3-trichloro-1,3-disilacyclobutane, 1-bromo-1,3-disilacyclobutane, 1-chloro-1,3-disilacyclobutane, 1,1,4,4-tetrachloro-1,4-disilacyclohexane, 1,1,4,4-tetrachlorobromo-1,4-disilacyclohexane, 1,1,4-trichloro-1,4-disilacyclohexane, 1,1,4-tribromo-1,4-disilacyclohexane, 1,4-dichloro-1,4-disilacyclohexane, 1,4-dibromo-1,4-disilacyclohexane, 1,1-dichloro-1,4-disilacyclohexane, 1,1-dibromo-1,4-disilacyclohexane, 1-bromo-1,4-disilacyclohexane, 1-chloro-1,4-disilacyclohexane, 1,1,3,3-tetrachloro-1,3-disilacyclohexane, 1,1,3,3-tetrachlorobromo-1,3-disilacyclohexane, 1,1,3-trichloro-1,3-disilacyclohexane, 1,1,3-tribromo-1,3-disilacyclohexane, 1,3-dichloro-1,3-disilacyclohexane, 1,3-dibromo-1,3-disilacyclohexane, 1,1-dichloro-1,3-disilacyclohexane, 1,1-dibromo-1,3-disilacyclohexane, 1-bromo-1,3-disilacyclohexane, 1-chloro-1,3-disilacyclohexane, more preferably, 1,1-dichloro-1,3-disilacyclobutane, 1,3-dichloro-1,3-disilacyclobutane, 1,1-dibromo-1,3-disilacyclobutane, 1,3-dibromo-1,3-disilacyclobutane, 1-bromo-1-chloro-1,3-disilacyclobutane, 1-bromo-3-chloro-1,3-disilacyclobutane, 1,1,3-trichloro-1,3-disilacyclobutane, 1,1,3-tribromo-1,3-disilacyclobutane, 1,1-dichloro-3-bromo-1,3-disilacyclobutane, 1,3-dichloro-1-bromo-1,3-disilacyclobutane, 1,1,3,3-tetrachloro-1,3-disilacyclobutane, 1,1,3,3-tetrabromo-1,3-disilacyclobutane, 1,1,3-tribromo-3-chloro-1,3-disilacyclobutane, 1,1-dibromo-3,3-dichloro-1,3-disilacyclobutane, 1,3-dibromo-1,3-dichloro-1,3-disilacyclobutane, 1-bromo-1,1,3-trichloro-1,3-disilacyclobutane.

They can be used singly or in combination of two or more.

Examples of the compound represented by the formula (4) include:

trichlorosilane, dichlorosilane, tetrachlorosilane, bromodichlorosilane, bromochlorosilane, dibromodichlorosilane, tribromosilane, dibromosilane, tetrabromosilane.

They can be used singly or in combination of two or more.

The co-ammonolysis of the compound represented by the formula (3), and the compound represented by the formula (4) is carried out in a solvent. The compound represented by the formula (3) is dissolved in a solvent and subsequently the compound represented by the formula (4) is added. Ammonia is added thereto. The molar amount of the added ammonia is preferably 3 to 6 times of the sum of molar of the compound represented by the formula (3) and molar of the compound represented by the formula (4). The co-ammonolysis is conducted at a temperature between −10 to 20° C. for 1 to 24 hours. After the reaction, by-product is removed by filtration to obtain a polycarbosilazane in a solvent.

The solvent used for the co-ammonolysis is not particularly limited. Suitable solvents include: aromatic compounds such as benzene, toluene, xylene, ethylbenzene, diethylbenzene, trimethylbenzene and triethylbenzene; saturated hydrocarbon compounds such as cyclohexane, decahydronaphthalene, dipentene, n-pentane, i-pentane, n-hexane, i-hexane, n-heptane, i-heptane, n-octane, i-octane, n-nonane, i-nonane, n-decane, ethylcyclohexane, methylcyclohexane, cyclohexane and p-menthane; unsaturated hydrocarbon compounds such as cyclohexene; halogenated hydrocarbon compounds such as methylene chloride, chloroform, carbon tetrachloride, bromoform, ethylene chloride, ethylidene chloride, trichloroethane and tetrachloroethane; heterocyclic compounds such as, pyrrolidine, pyrrole, imidazolidine, piperidine, pyridine, methylpyridine, dimethylpyridine, pyridazine, azepane and quinoline; ether compounds such as dipropyl ether, dibutyl ether and anisole; ester compounds such as n-butyl acetate, i-butyl acetate, n-amyl acetate and i-amyl acetate; ketone compounds such as methyl isobutyl ketone (MIBK); tertiary amine compounds such as trimethylamine, dimethylethylamine, diethyl methyl amine and triethylamine.

Solvent can be used singly or in combination of two or more.

<Composition>

The composition according to the present invention comprises the above-described polycarbosilazane and a solvent.

The solvent is preferably at least one selected from the group consisting of aromatic compounds, saturated hydrocarbon compounds, unsaturated hydrocarbon compounds, ether compounds, ester compounds, and ketone compounds. In particular, the following are included: aromatic compounds such as benzene, toluene, xylene, ethylbenzene, diethylbenzene, trimethylbenzene and triethylbenzene; saturated hydrocarbon compounds such as cyclohexane, decahydronaphthalene, dipentene, n-pentane, i-pentane, n-hexane, i-hexane, n-heptane, i-heptane, n-octane, i-octane, n-nonane, i-nonane, n-decane, ethylcyclohexane, methylcyclohexane, cyclohexane and p-menthane; unsaturated hydrocarbon compounds such as cyclohexene; ether compounds such as dipropyl ether, dibutyl ether and anisole; ester compounds such as n-butyl acetate, i-butyl acetate, n-amyl acetate and i-amyl acetate; ketone compounds such as methyl isobutyl ketone (MIBK).

Solvent can be used singly or in combination of two or more.

The composition according to the present invention comprises preferably from 1 to 50 mass %, more preferably from 1 to 30 mass % of the polycarbosilazane, based on the total mass of the composition.

The composition according to the present invention can comprise optionally further components. These components are described following. The content of components other than polycarbosilazane and solvent is preferably 10% or less, and more preferably 5% or less, based on the total mass of the composition.

<Optional Components>

Examples of the optional components include surfactant.

Since surfactant can improve coatability, it is preferable to be used. Examples of the surfactant that can be used in the composition according to the present invention include nonionic surfactants, anionic surfactants, amphoteric surfactants, and the like.

Examples of the nonionic surfactant include, polyoxyethylene alkyl ethers such as polyoxyethylene lauryl ether, polyoxyethylene oleyl ether and polyoxyethylene cetyl ether; polyoxyethylene fatty acid diester; polyoxy fatty acid monoester; polyoxyethylene polyoxypropylene block polymer; acetylene alcohol; acetylene glycol; acetylene alcohol derivatives such as polyethoxylate of acetylene alcohol; acetylene glycol derivatives such as polyethoxylate of acetylene glycol; fluorine-containing surfactants such as Fluorad (trade name, manufactured by 3M Japan Limited), Megafac (trade name, manufactured by DIC Corporation), Surufuron (trade name, manufactured by Asahi Glass Co., Ltd.); or organosiloxane surfactants such as KP341 (trade name, manufactured by Shin-Etsu Chemical Co., Ltd.). Examples of said acetylene glycol include 3-methyl-1-butyne-3-ol, 3-methyl-1-pentyn-3-ol, 3,6-dimethyl-4-octyne-3,6-diol, 2,4,7,9-tetramethyl-5-decyne-4,7-diol, 3,5-dimethyl-1-hexyne-3-ol, 2,5-dimethyl-3-hexyne-2,5-diol, 2,5-dimethyl-2,5-hexane-diol and the like.

Examples of the anionic surfactant include ammonium salt or organic amine salt of alkyl diphenyl ether disulfonic acid, ammonium salt or organic amine salt of alkyl diphenyl ether sulfonic acid, ammonium salt or organic amine salt of alkyl benzene sulfonic acid, ammonium salt or organic amine salt of polyoxyethylene alkyl ether sulfuric acid, ammonium salt or organic amine salt of alkyl sulfuric acid and the like.

Examples of the amphoteric surfactant include 2-alkyl-N-carboxymethyl-N-hydroxyethyl imidazolium betaine, lauric acid amide propyl hydroxysulfone betaine and the like.

These surfactants can be used alone or as a mixture of two or more kinds, and the content thereof is usually 50 to 10,000 ppm, preferably 100 to 5,000 ppm, based on the total mass of the composition.

<Method for Producing a Silicon-Containing Film>

A method for producing a silicon-containing film according to the present invention comprises: forming a coating film above a substrate with the above-described composition; and heating the coating film.

In the present invention, the "above a substrate" includes the case where the composition is applied directly on a substrate and the case where the composition is applied on a substrate via one or more intermediate layer.

The method for applying the composition to such a substrate can be selected from usual methods such as a spin coating, a dip coating, a spray coating, a transfer method, a roll coating, a bar coating, a doctor coating, a brush coating, a flow coating, or a slit coating and the like. The substrate on which the composition is applied is suitable substrate such as a silicon substrate, a glass substrate and a resin film. Semiconductor elements and the like can be formed on the substrate, if necessary. If necessary, the coating process can be repeated twice or more to form a coating film having a desired thickness.

After forming the coating film of the composition according to the present invention, for the purposes of drying or decreasing the remaining amount of solvent of the coating film, a prebaking step can be carried out. The prebaking step can be carried out under an oxidizing atmosphere and a non-oxidizing atmosphere, preferably in the atmosphere of an inert gas for curing under a non-oxidizing atmosphere or air for curing under an oxidizing atmosphere, preferably at from 50 to 400° C., for 10 to 300 seconds on a hotplate or 1 to 30 minutes in a clean oven.

Then, the optionally prebaked coating film is cured by heating under an oxidizing atmosphere or under a non-oxidizing atmosphere to form a silicon-containing film.

The oxidizing atmosphere means an atmosphere in which oxygen partial pressure is 20 to 101 kPa, preferably 40 to 101 kPa and more preferably containing water vapor partial pressure of 1.5 to 80 kPa, when total pressure is 101 kPa.

Heating can be carried out within a temperature range from 200 to 800° C.

There are sometimes concerns that the heating in an atmosphere containing water vapor at a high temperature, for example exceeding 600° C., affects other element such as an electronic device, which is simultaneously exposed to the heating treatment. In such a case, the heating step can be divided into two or more stages, more preferably three or more stages. For example, the heating can be carried out first in an oxidizing atmosphere at low temperature, for example 200 to 400° C., second in an atmosphere containing water vapor at a relatively low temperature, for example 300 to 600° C., and subsequently in an atmosphere containing no water vapor at a higher temperature, for example 400 to 800° C.

Other components than water vapor in the atmosphere containing water vapor (hereinafter referred to as "dilution gas") can be any gas, and examples thereof are air, oxygen, nitrogen, nitrous oxide, ozone, helium, argon, and the like. In terms of quality of the obtained silicon-containing film, it is preferred to use oxygen as the dilution gas.

The non-oxidizing atmosphere means an atmosphere having an oxygen concentration of 1 ppm or less and a dew point of −76° C. or lower. Preferably, a gas atmosphere of $N_2$, Ar, He, Ne, $H_2$, or a mixture of two or more of any of these is used.

Heating can be carried out within a temperature range from 200 to 1000° C.

The heating rate to the target temperature and the cooling rate during the heating are not particularly limited and can be generally within a range from 1 to 100° C./min. In addition, holding time after reaching the target temperature is not also limited in particular, and it can be generally within a range from 1 minute to 10 hours.

The cured silicon-containing film obtained by heating under the oxidizing atmosphere is a siliceous film. The siliceous film in the present invention means a film comprising oxygen atom and silicon atom, in which the ratio of the number of oxygen atom to the number of silicon atom (O/Si) is 1.20 to 2.50, preferably 1.40 to 2.50, and more preferably 1.60 to 2.45. The siliceous film can contain other atoms such as hydrogen, nitrogen and carbon.

The cured silicon-containing film obtained by heating under the non-oxidizing atmosphere is a silicon carbonitrogenous film. The silicon carbonitrogenous film in the present invention means a film comprising nitrogen atom, carbon atom and silicon atom, in which the ratio of the number of nitrogen atom to the number of silicon atom (N/Si) is 0.70 to 1.10, preferably 0.75 to 0.98 and the ratio of the number of carbon atom to the number of silicon atom (C/Si) is 0.02 to 12.5, preferably 0.03 to 11.5. The silicon carbonitrogenous film can contain other atoms such as hydrogen and oxygen.

Film thickness of the silicon-containing film is not particularly limited but preferably 0.1 to 1.8 μm, and more preferably 0.1 to 1.5 μm.

The method for producing an electronic device according to the present invention comprises the above described method. Preferably, the electronic device is a semiconductor device, solar cell chip, organic light emitting diode and inorganic light emitting diode. One preferable embodiment of the device of this invention is a semiconductor device.

EXAMPLES

Hereinafter, the present invention will be described with working examples. These examples are given only for illustrative purpose and not intended to limit the scope of the present invention.

Synthesis Example 1: Polycarbosilazane 1

The inside of a 1 L reaction vessel, equipped with a cooling condenser, a mechanical stirrer and a temperature controller, is replaced with dry nitrogen and thereafter 500 mL of dry pyridine is put into the reaction vessel, which is then cooled down to −3° C. Then, 12.3 g of dichlorosilane and 2.75 g of 1,1,3,3-tetrachloro-1,3-disilacyclobutane are added. Upon confirming that the reaction mixture becomes 0° C. or less, 11.3 g of ammonia is slowly blown into the reaction mixture while stirring. Subsequently, stirring is continued for 30 minutes, and then dry nitrogen is blown into the liquid layer for 30 minutes to remove excess ammonia. The resulting product in slurry form is subjected to pressure filtration through 0.2 μm pore size Teflon (trade name) filter under dry nitrogen atmosphere to obtain 400 ml of filtrate. After pyridine in the filtrate is distilled off, xylene is added to obtain a solution of the polycarbosilazane in xylene of 21.2 mass % concentration. The mass average molecular weight (hereinafter referred to as Mw) of the obtained polycarbosilazane is 5,260 measured by gel permeation chromatography in terms of polystyrene.

Synthesis Example 2: Polycarbosilazane B

The inside of a 1 L reaction vessel, equipped with a cooling condenser, a mechanical stirrer and a temperature controller, is replaced with dry nitrogen and thereafter 500 mL of dry pyridine is put into the reaction vessel, which is then cooled down to −3° C. Then, 9.67 g of dichlorosilane and 4.33 g of 1,1,3,3-tetrachloro-1,3-disilacyclobutane are added. Upon confirming that the reaction mixture becomes 0° C. or less, 10.3 g of ammonia is slowly blown into the reaction mixture while stirring. Subsequently, stirring is continued for 30 minutes, and then dry nitrogen is blown into the liquid layer for 30 minutes to remove excess ammonia. The resulting product in slurry form is subjected to pressure filtration through 0.2 μm pore size Teflon (trade name) filter under dry nitrogen atmosphere to obtain 400 ml of filtrate. After pyridine in the filtrate is distilled off, xylene is added to obtain a solution of the polycarbosilazane in xylene of 21.5 mass % concentration. Mw of the obtained polycarbosilazane is 7,850 measured by gel permeation chromatography in terms of polystyrene.

Synthesis Example 3: Polycarbosilazane C

The inside of a 1 L reaction vessel, equipped with a cooling condenser, a mechanical stirrer and a temperature controller, is replaced with dry nitrogen and thereafter 500 mL of dry pyridine is put into the reaction vessel, which is then cooled down to −3° C. Then, 20.1 g of dichlorosilane and 2.25 g of 1,1,3,3-tetrachloro-1,3-disilacyclobutane are added. Upon confirming that the reaction mixture becomes 0° C. or less, 16.8 g of ammonia is slowly blown into the reaction mixture while stirring. Subsequently, stirring is continued for 30 minutes, and then dry nitrogen is blown into the liquid layer for 30 minutes to remove excess ammonia. The resulting product in slurry form is subjected to pressure filtration through 0.2 μm pore size Teflon (trade name) filter under dry nitrogen atmosphere to obtain 400 ml of filtrate. After pyridine in the filtrate is distilled off, xylene is added to obtain a solution of the polycarbosilazane in xylene of 21.0 mass % concentration. Mw of the obtained polycarbosilazane is 4,880 measured by gel permeation chromatography in terms of polystyrene.

Polycarbosilazane A to C are identified as polyperhydrocarbosilazane from measurements of an infrared absorption spectrum using FTIR6100 (JASCO Corporation), 1H-NMR, and $^{29}$Si-NMR. Polycarbosilazane A to C are free of Si—Si bonds form $^{29}$Si-NMR measurement.

Polycarbosilazane A to C have 4 membered rings consisting of 2 carbon and 2 Si, since there is a peak at 770 cm$^{-1}$ in Raman spectrum measured by Raman spectrometer (LabRAM HR Evolution, manufactured by HORIBA, Ltd.). FIG. 1 is a Raman spectrum of Polycarbosilazane B.

Comparative Synthesis Example 1: Polysilazane

A polysilazane is obtained according to the method described in JP H01-138108 A. This polysilazane is a polyperhydrosilazane.

Mw, C/Si ratio, and Intensity $CH_2$/(Intensity $CH_2$+Intensity NH) of the polymers obtained from synthesis examples and comparative synthesis examples are shown in Table 1. These are measured as described below.

[Mass Average Molecular Weight]

The mass average molecular weight (Mw) is measured by Gel permeation chromatography (GPC) in terms of polystyrene. GPC is measured using Alliance e2695 High Performance GPC system (Nihon Waters K. K.) and Super Multipore HZ—N GPC column (Tosoh Corporation). The measurement is performed using monodispersed polystyrene as a standard sample and chloroform as an eluent, under the conditions of a flow rate of 0.6 ml/min and a column temperature of 40° C., and thereafter calculating Mw as a relative molecular weight to the standard sample.

[C/Si ratio]

C/Si ratio is measured in the following manner. A solution containing the obtained polymer and a solvent is spin-coated on a 4-inch wafer at 1,000 rpm under nitrogen atmosphere by using a spin coater (spin coater 1HDX2 (trade name) by Mikasa Co. Ltd.). The obtained coating film is baked at 240° C. for 10 minutes. The baked film is subjected to elemental analysis by Rutherford Backscattering Spectrometry using Pelletron 3SDH (trade name, manufactured by National Electrostatics Corporation) to measure the atomic ratio.

[Intensity $CH_2$/(Intensity $CH_2$+Intensity NH)]

The measurement of $^1$H-NMR is carried out on a sample solution which is obtained by dissolving 0.4 g of the obtained polymer in 1.6 g of a deuterochloroform. Tetramethylsilane is added to the sample solution as internal standard for calibrating chemical shift. The sample solution is measured 80 times using a nuclear magnetic resonance apparatus, JNM-ECS400 (JEOL Ltd.) to obtain a $^1$H-NMR spectrum. An integrated intensity between 1.7 and 2.2 ppm ("Intensity $CH_2$") and an integrated intensity between 1.0 and 1.6 ppm ("Intensity NH") are measured. The Intensity $CH_2$ is divided by the sum of Intensity $CH_2$ and Intensity NH to obtain (Intensity $CH_2$)/[(Intensity $CH_2$)+(Intensity NH)].

TABLE 1

| Table 1 | | $M_W$ | C/Si ratio | Intensity $CH_2$/ (Intensity $CH_2$ + Intensity NH) |
|---|---|---|---|---|
| Synthesis example 1 | Polycarbosilazane A | 5,260 | 0.179 | 0.198 |
| Synthesis example 2 | Polycarbosilazane B | 7,850 | 0.297 | 0.208 |
| Synthesis example 3 | Polycarbosilazane C | 4,880 | 0.101 | 0.183 |
| Comparative synthesis example 1 | Polysilazane | 8,800 | 0 | 0 |

Example 11

A composition in which Polycarbosilazane A is mixed with xylene as solvent so that the concentration of Polysilazane A is 18 mass % is coated on a Si wafer under nitrogen atmosphere using a spin coater (1HDX2, Mikasa Co. Ltd.) to form a coating film. The obtained coating film is heated at 150° C. for 3 minutes (pre-bake). The film thickness at this time is 450 nm. The pre-baked coating film is heated at 350° C. for 60 minutes under water vapor atmosphere, and further heated at 600° C. for 60 minutes under nitrogen atmosphere to obtain a cured film.

The cured film obtained from Example 11 is a siliceous film in which the ratio of the number of oxygen atom to the number of silicon atom (O/Si) is 1.77. This is determined by elemental analysis with secondary ion mass spectrometry.

Example 12

A cured film is obtained in the same manner as in the above Example 11 except that Polycarbosilazane A is changed to Polycarbosilazane B.

The cured film obtained from Example 12 is a siliceous film in which O/Si is 1.65.

Comparative Example 11

A cured film is obtained in the same manner as in the above Example 11 except that Polycarbosilazane A is changed to the Polysilazane of Comparative synthesis example 1.

The cured film obtained from Comparative example 12 is a siliceous film in which O/Si is 1.97.

Example 21

A cured film is obtained in the same manner as in the above Example 11 except that heating at 350° C. for 60 minutes under water vapor atmosphere is changed to heating at 450° C. for 60 minutes under nitrogen atmosphere.

The cured film obtained from Example 21 is a silicon carbonitride film in which N/Si is 0.581 and C/Si is 0.168.

Example 22

A cured film is obtained in the same manner as in the above Example 21 except that Polycarbosilazane A is changed to Polycarbosilazane B.

The cured film obtained from Example 22 is a silicon carbonitride film in which N/Si is 0.458 and C/Si is 0.289.

Comparative Example 21

A cured film is obtained in the same manner as in the above Example 21 except that Polycarbosilazane A is changed to the Polysilazane of Comparative synthesis example 1.

The cured film obtained from Comparative example 21 is a silicon carbonitride film in which N/Si is 0.737 and C/Si is not measurable.

Film thickness and refractive index of films after pre-baking, and film thickness, refractive index, shrinkage amount, residual stress, relative wet etching rate and electrical breakdown field of the cured films are measured. Obtained results are shown in Tables 2 and 3. Each measurement method is as follows.

[Film Thickness]

Film thickness is measured with a spectroscopic ellipsometer M-2000V (JA Woollam). The film thickness is measured at 8 points excluding the central part, and the average value thereof is defined as the film thickness.

[Refractive Index]

Refractive index is measured at wavelength of 633 nm with a spectroscopic ellipsometer M-2000V (JA Woollam).

[Shrinkage Amount]

Shrinkage amount (%) is a value of((film thickness of the cured film)−(film thickness of the film after pre-baking))/(film thickness of the film after pre-baking)×100.

[Residual Stress]

Residual stress of the cured film is measured using a thin film stress measurement system FLX-3300-T (Toho Technology Corp.).

[Relative Wet Etching Rate (WER)]

A thermal oxide film-coated silicon wafer as a reference is prepared.

The cured film coated-wafer and thermal oxide film-coated wafer are immersed at 20° C. for 3 minutes in an aqueous solution containing 1.0 mass % of hydrofluoric acid, then washed with pure water and dried, then film thickness of the films are measured with a spectroscopic ellipsometer M-2000V (JA Woollam). The process is repeated. The wet etching rate is calculated by means of a linear approximation from the relation between an etching time and an amount of decrease in film thickness. The relative WER is calculated by the WER of the cured film divided by the WER of the thermal oxide film.

[Electrical breakdown field (Fbd)]

A cured film is formed so that its film thickness becomes 200 nm by controlling the concentration of the polymer. Electrical breakdown field of the cured film is measured using SSM495 272A-M100 (Japan SSM K. K.). The electric field when the current density exceeds $1E^{-6}$ (A/cm$^2$) is taken as Fbd (MV/cm).

TABLE 2

| Table 2 | | Example 11 Poly-carbosilazane A | Example 12 Poly-carbosilazane B | Comparative example 11 Polysilazane |
|---|---|---|---|---|
| After prebake | Film thickness (nm) | 460 | 456 | 453 |
| | Refractive index | 1.583 | 1.584 | 1.570 |
| Cured film | Film thickness (nm) | 403 | 406 | 401 |
| | Refractive index | 1.451 | 1.454 | 1.444 |
| | Shrinkage amount (%) | 12.4 | 11.0 | 11.6 |
| | Residual stress (Mpa) | 82 | 68 | 181 |
| | Relative WER | 0.63 | 0.40 | 4.82 |
| | Fbd(MV/cm) | 6.0 | 5.4 | 2.4 |

TABLE 3

| Table | | Example 21 Poly-carbosilazane A | Example 22 Poly-carbosilazane B | Comparative example 21 Polysilazane |
|---|---|---|---|---|
| After prebake | Film thickness (nm) | 252 | 255 | 252 |
| | Refractive index | 1.585 | 1.59 | 1.571 |
| Cured film | Film thickness (nm) | 154 | 181 | 153 |
| | Refractive index | 1.764 | 1.645 | 1.908 |
| | Shrinkage amount (%) | 38.7 | 28.9 | 39.5 |
| | Residual stress (Mpa) | 139 | −211 | 845 |
| | Relative WER | 0.27 | 0.31 | 5.44 |
| | Fbd(MV/cm) | 2.3 | 0.6 | 1.0 |

Example 31

A composition in which Polycarbosilazane A is mixed with xylene as solvent is coated on a Si wafer under nitrogen atmosphere using a spin coater (1HDX2, Mikasa Co. Ltd.) to form a coating film. The obtained coating film is heated at 150° C. for 3 minutes (pre-bake). The pre-baked coating film is heated at 300° C. for 60 minutes under water vapor atmosphere, and further heated at 850° C. for 60 minutes under nitrogen atmosphere to obtain a cured film. The concentration of the composition is controlled so that film thickness after pre-baking becomes 0.5 μm, 1 μm, 1.5 μm, 1.5 μm, 2.0 μm, 2.5 μm, or 3.0 μm.

Comparative Example 31

A cured film is obtained in the same manner as in the above Example 31 except that Polycarbosilazane A is changed to the Polysilazane of Comparative synthesis example 1.

[Crack Resistance]

Each cured film is visually observed and evaluated according to the following criteria.

A: No cracks is observed in the cured film.

B: Cracks are observed in part of the cured film.

C: Cracks are observed in the entire cured film.

TABLE 4

| | | 0.5 μm | 1.0 μm | 1.5 μm | 2.0 μm | 2.5 μm | 3.0 μm |
|---|---|---|---|---|---|---|---|
| Example 31 | Polycarbosilazane A | A | A | A | B | B | C |
| Comparative example 31 | Polysilazane | A | A | B | C | C | C |

The invention claimed is:

1. A polycarbosilazane comprising a repeating unit represented by the following formula (1) and a repeating unit represented by the following formula (2):

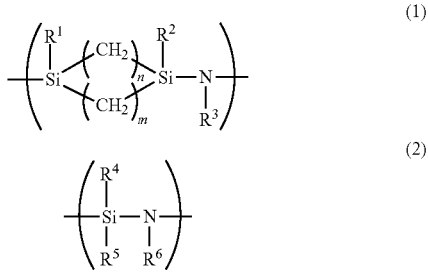

wherein,
$R^1$, $R^2$, and $R^3$ are each independently a single bond, hydrogen or $C_{1-4}$ alkyl;
$R^4$, $R^5$, and $R^6$ are each independently a single bond or hydrogen;
provided that when $R^1$, $R^2$, $R^4$, and $R^5$ are single bonds, $R^1$, $R^2$, $R^4$, and $R^5$ are bonded to N contained in other repeating units, and when $R^3$ and $R^6$ are single bonds, $R^3$ and $R^6$ are bonded to N contained in other repeating units; and
n and m are each independently 1 to 3.

2. The polycarbosilazane according to claim 1, wherein the ratio of the number of C atoms to the number of Si atoms contained in the molecule of the polycarbosilazane is 5 to 250%.

3. The polycarbosilazane according to claim 1, wherein the ratio of the number of C atoms to the number of Si atoms contained in the molecule of the polycarbosilazane is 5 to 120%.

4. The polycarbosilazane according to claim 1, wherein the ratio of the number of C atoms to the number of Si atoms contained in the molecule of the polycarbosilazane is 8 to 50%.

5. The polycarbosilazane according to claim 1, wherein a ratio of an integrated intensity between 1.7 and 2.2 ppm with respect to sum of an integrated intensity between 1.7 and 2.2 ppm and an integrated intensity between 1.0 and 1.6 ppm in $^1$H-NMR spectrum is 0.05 to 0.5.

6. The polycarbosilazane according to claim 1, wherein the mass average molecular weight is 1,500 to 25,000 measured by gel permeation chromatography in terms of polystyrene.

7. The polycarbosilazane according to claim 1, wherein the polycarbosilazane is a polyperhydrocarbosilazane.

8. A composition comprising the polycarbosilazane according to claim 1 and a solvent.

9. The composition according to claim 8, wherein the solvent is at least one selected from a group consisting of aromatic compounds, saturated hydrocarbon compounds, unsaturated hydrocarbon compounds, ether compounds, ester compounds, and ketone compounds.

10. The composition according to claim 8, wherein the composition comprises 1 to 50 mass % of the polycarbosilazane based on the total mass of the composition.

11. A method for producing a silicon-containing film comprising: forming a coating film on a substrate with the composition according to claim 8; and heating the coating film.

12. The method for producing a silicon-containing film according to claim 11, wherein the heating is performed under an oxidizing atmosphere.

13. The method for producing a silicon-containing film according to claim 11, wherein the heating is performed under a non-oxidizing atmosphere.

14. A silicon-containing film obtainable by the method according to claim 11.

15. A method for producing an electronic device comprising the method according to claim 11.

* * * * *